(12) United States Patent
Doisneau et al.

(10) Patent No.: US 11,493,109 B2
(45) Date of Patent: Nov. 8, 2022

(54) COMPOSITE AND POWER TRANSMISSION BELT

(71) Applicant: COMPAGNIE GENERALE DES ETABLISSEMENTS MICHELIN, Clermont-Ferrand (FR)

(72) Inventors: David Doisneau, Clermont-Ferrand (FR); Julie Rognon, Saint Cyr sur Loire (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 805 days.

(21) Appl. No.: 16/302,956

(22) PCT Filed: May 19, 2017

(86) PCT No.: PCT/FR2017/051227
§ 371 (c)(1),
(2) Date: Nov. 19, 2018

(87) PCT Pub. No.: WO2017/198967
PCT Pub. Date: Nov. 23, 2017

(65) Prior Publication Data
US 2019/0145493 A1    May 16, 2019

(30) Foreign Application Priority Data
May 20, 2016    (FR) ...................................... 1654526

(51) Int. Cl.
*F16G 1/08* (2006.01)
*B29D 29/10* (2006.01)
(Continued)

(52) U.S. Cl.
CPC ............... *F16G 1/08* (2013.01); *B29D 29/10* (2013.01); *C08G 8/04* (2013.01); *C08J 5/06* (2013.01);
(Continued)

(58) Field of Classification Search
CPC ......... F16G 1/08; D06M 15/00; D06M 15/41; D06M 15/693; B29K 2023/16;
(Continued)

(56) References Cited

U.S. PATENT DOCUMENTS 3,276,948 A * 10/1966 Gallagher .................. C08J 5/06
442/290
5,891,561 A    4/1999 Kinoshita et al.
(Continued)

FOREIGN PATENT DOCUMENTS

EP    0964030 A1    12/1999
FR    2 978 770 A1    2/2013
(Continued)

OTHER PUBLICATIONS

International Search Report dated Aug. 16, 2017, in corresponding PCT/FR2017/051227 (6 pages).

*Primary Examiner* — Camie S Thompson
(74) *Attorney, Agent, or Firm* — Venable LLP

(57) ABSTRACT

A composite comprises: at least one reinforcing element (10), an adhesive layer (14) made from an adhesive composition and coating the reinforcing element (10), an elastomeric bonding layer (16) made from an elastomeric bonding composition and directly coating the adhesive layer (14), and an elastomeric body made from an elastomeric matrix and embedded in which is the reinforcing element (10) coated with the adhesive layer (14) and with the elastomeric bonding layer (16). The adhesive composition comprises a phenol-aldehyde resin based: on an aromatic polyphenol (Continued)

comprising at least one aromatic ring bearing at least two hydroxyl functions in the meta position relative to one another, the two positions ortho to at least one of the hydroxyl functions being unsubstituted; and on an aromatic aldehyde bearing an aldehyde function, comprising at least one aromatic ring.

2 Claims, 2 Drawing Sheets

(51) Int. Cl.
| | |
|---|---|
| F16G 1/28 | (2006.01) |
| C09J 109/06 | (2006.01) |
| C08J 5/06 | (2006.01) |
| C09J 161/12 | (2006.01) |
| D06M 15/693 | (2006.01) |
| D06M 15/00 | (2006.01) |
| C08G 8/04 | (2006.01) |
| C09J 7/29 | (2018.01) |
| C09J 7/30 | (2018.01) |
| F16G 5/06 | (2006.01) |
| F16G 5/20 | (2006.01) |
| F16G 5/08 | (2006.01) |
| D06M 15/41 | (2006.01) |
| B29K 23/00 | (2006.01) |
| B29K 105/24 | (2006.01) |

(52) U.S. Cl.
CPC . *C09J 7/29* (2018.01); *C09J 7/30* (2018.01); *C09J 109/06* (2013.01); *C09J 161/12* (2013.01); *D06M 15/00* (2013.01); *D06M 15/693* (2013.01); *F16G 1/28* (2013.01); *F16G 5/06* (2013.01); *F16G 5/20* (2013.01); B29K 2023/16 (2013.01); B29K 2105/24 (2013.01); C08J 2300/26 (2013.01); C09J 2301/414 (2020.08); C09J 2400/263 (2013.01); C09J 2407/006 (2013.01); C09J 2411/006 (2013.01); C09J 2423/16 (2013.01); C09J 2423/166 (2013.01); C09J 2461/00 (2013.01); D06M 15/41 (2013.01); F16G 5/08 (2013.01)

(58) Field of Classification Search
CPC .............. B29K 2105/24; B29D 29/10; Y10T 428/31761; Y10T 428/31877; Y10T 428/31917; Y10T 428/3886; Y10T 428/31949; Y10T 428/31786; C08K 5/053; C08K 5/07; C08G 8/06; C08G 8/22; C08G 8/04; Y10S 156/91; C09J 115/05; C09J 109/06; C09J 123/34; C09J 161/12; C09J 2423/16; C09J 2461/00; C09J 7/29; C09J 7/30; C08L 61/06; C08L 61/12; C08L 7/02; C08L 9/06; C08J 5/06; C08J 2323/16; C08J 2300/26
USPC ...... 156/335, 910; 427/370; 428/477.4, 506, 428/526, 517, 527, 480; 442/290
See application file for complete search history.

(56) References Cited

U.S. PATENT DOCUMENTS

| | | | |
|---|---|---|---|
| 6,251,977 | B1 | 6/2001 | Georget et al. |
| 8,247,490 | B1* | 8/2012 | Li .................. C09J 115/005 524/510 |
| 9,840,644 | B2 | 12/2017 | Doisneau et al. |
| 9,938,434 | B2 | 4/2018 | Doisneau |
| 10,005,929 | B2 | 6/2018 | Doisneau et al. |
| 10,040,976 | B2 | 8/2018 | Doisneau et al. |
| 2012/0125506 | A1 | 5/2012 | Custodero et al. |
| 2014/0235125 | A1 | 8/2014 | Doisneau et al. |
| 2016/0251550 | A1 | 9/2016 | Michoud et al. |
| 2017/0023099 | A1 | 1/2017 | Franchini et al. |
| 2017/0165942 | A1 | 6/2017 | Michoud et al. |
| 2017/0166010 | A1 | 6/2017 | Michoud et al. |
| 2017/0166011 | A1 | 6/2017 | Michoud et al. |
| 2017/0174006 | A1 | 6/2017 | Michoud et al. |
| 2017/0362370 | A1 | 12/2017 | Doisneau et al. |
| 2018/0009972 | A1 | 1/2018 | Doisneau et al. |
| 2018/0016433 | A1 | 1/2018 | Doisneau et al. |
| 2018/0118983 | A1 | 5/2018 | Doisneau et al. |
| 2018/0362754 | A1 | 12/2018 | Thuilliez et al. |
| 2019/0112512 | A1 | 4/2019 | Doisneau et al. |
| 2019/0119535 | A1 | 4/2019 | Doisneau |

FOREIGN PATENT DOCUMENTS

| | | | | |
|---|---|---|---|---|
| FR | 3 017 071 | A1 | 8/2015 | |
| WO | 2012/112240 | A1 | 8/2012 | |
| WO | 2014/111440 | A2 | 7/2014 | |
| WO | WO-2015007642 | A1 * | 1/2015 | ............ B32B 25/10 |
| WO | 2015/151010 | A1 | 10/2015 | |

* cited by examiner

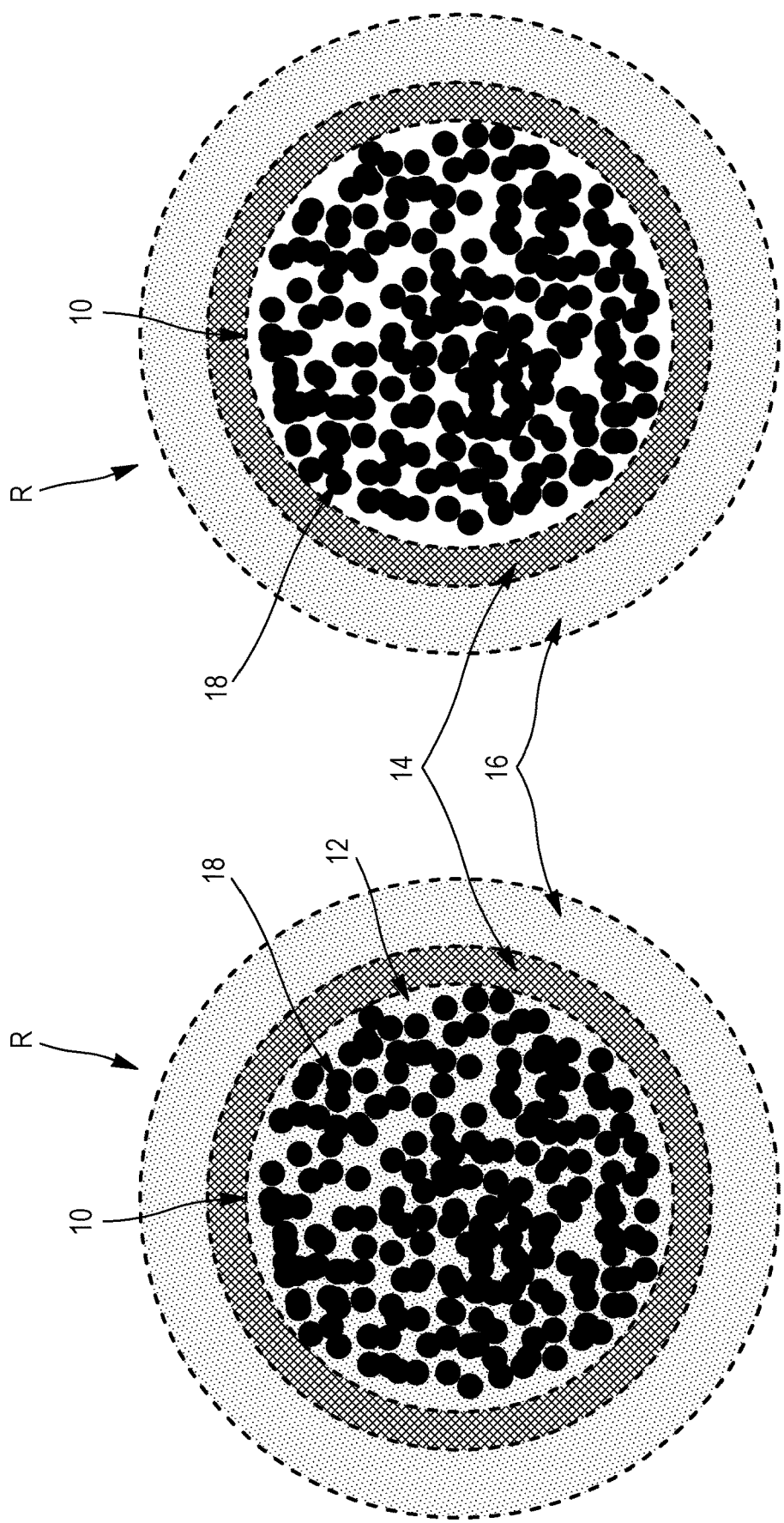

COMPOSITE AND POWER TRANSMISSION BELT

BACKGROUND

The field of the present invention is that of composites comprising an elastomeric material and reinforcing elements embedded in this elastomeric material. The present invention relates more particularly to such composites that form power transmission belts.

Known from the prior art, in particular from WO2015/151010, is a composite that forms a power transmission belt comprising an elastomeric material comprising at least one elastomer of ethylene/alpha-olefin type, for example EPDM, and reinforcing elements embedded in this elastomeric material.

Each reinforcing element is a multifilament ply of elementary textile monofilaments. Each reinforcing element is impregnated by a composition that ensures the cohesion of the monofilaments of the multifilament ply with one another and that makes it possible to prevent the fraying of each reinforcing element. This cohesion composition, forming a layer at the heart of the reinforcing element, is derived from the reaction of one or more isocyanates and comprises for example a uretidinedione, an isocyanurate or a mixture of these two compounds. Each impregnated reinforcing element is coated with an adhesive layer. The adhesive layer comprises an adhesive composition of RFL (resorcinol-formaldehyde latex) type. These RFL-type adhesive compositions comprise, in a well-known way, a thermosetting phenolic resin, obtained by the condensation of resorcinol with formaldehyde, and one or more latices of diene rubber in aqueous solution.

However, it is desirable to reduce, or even eliminate in the long run, formaldehyde from elastomer composites due to the environmental impact of these composites and the recent developments in regulations, especially European regulations, relating to this type of compound.

SUMMARY

The aim of the invention is to provide composites comprising novel simple adhesive systems that make it possible to maintain, or even to improve, the endurance of these composites.

One subject of the invention is a composite comprising:
- at least one reinforcing element,
- an adhesive layer made from an adhesive composition and coating the reinforcing element,
- an elastomeric bonding layer made from an elastomeric bonding composition and directly coating the adhesive layer,
- an elastomeric body made from an elastomeric matrix and embedded in which is the reinforcing element coated with the adhesive layer and with the elastomeric bonding layer, the adhesive composition comprising at least one phenol-aldehyde resin based:
- on at least one aromatic polyphenol comprising at least one aromatic ring bearing at least two hydroxyl functions in the meta position relative to one another, the two positions ortho to at least one of the hydroxyl functions being unsubstituted, and
- on at least one aromatic aldehyde bearing at least one aldehyde function, comprising at least one aromatic ring.

BRIEF DESCRIPTION OF THE DRAWINGS

FIGS. 2A and 2B are two variants of coated reinforcing elements R in accordance with the invention.

DETAILED DESCRIPTION

Figure 1:
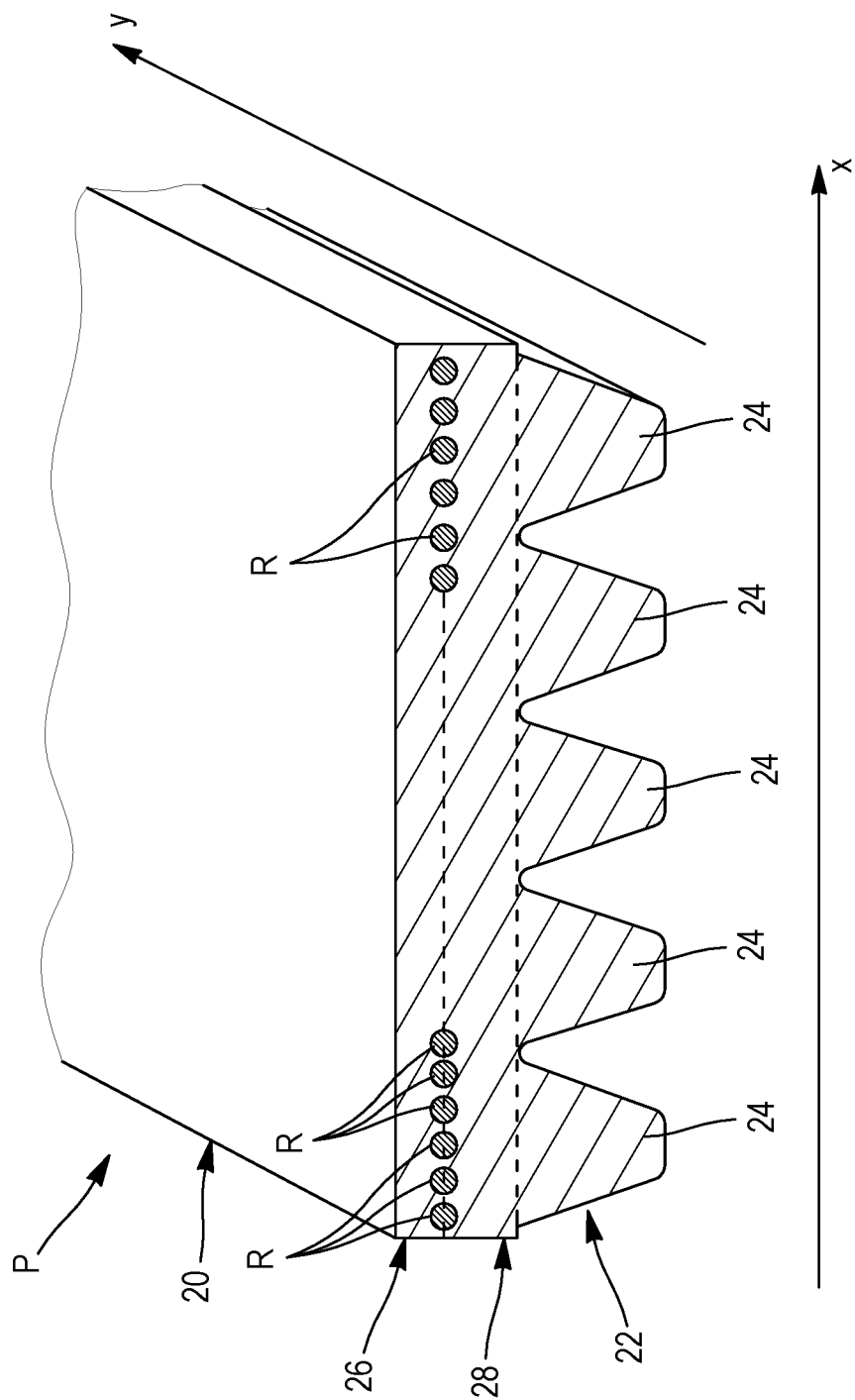
FIG. 1 is a composite according to the invention that forms a power transmission belt P.

"Meta position relative to one another" is understood to mean that the hydroxyl functions are borne by carbons of the aromatic ring which are separated from one another by a single other carbon of the aromatic ring.

"Position ortho to a function" is understood to mean the position occupied by the carbon of the aromatic ring which is immediately adjacent to the carbon of the aromatic ring bearing the function.

The expression "composition based on" should, of course, be understood as meaning a resin comprising the mixture and/or the reaction product of the various base constituents used for this resin, it being possible for some of them to be intended to react or capable of reacting with one another or with their immediate chemical surroundings, at least partly, during the various phases of manufacture of the resin, of the reinforcing element or of the composite, in particular during a crosslinking step.

In accordance with the designation "aromatic polyphenol", the aromatic ring bearing at least two hydroxyl functions in the meta position relative to one another, the two positions ortho to at least one of the hydroxyl functions being unsubstituted, is a benzene ring.

The adhesive composition thus comprises at least one (that is to say, one or more) phenol-aldehyde resin; this phenol-aldehyde resin being based on at least one (that is to say, one or more) aromatic polyphenol and at least one (that is to say, one or more) aromatic aldehyde, which constituents will be described in detail below.

An elastomeric matrix is understood to mean a matrix having elastomeric behaviour.

An elastomeric bonding layer is understood to mean a layer having elastomeric behaviour that provides a physicochemical bond between the adhesive layer and the elastomeric matrix.

Layer "directly" coating an object is understood to mean that the layer is in contact with the object without any other object, in particular another layer, being interposed between the two.

In the present description, unless expressly indicated otherwise, all the percentages (%) shown are percentages by weight. The acronym "phr" signifies parts by weight per hundred parts of elastomer.

Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

Within the context of the invention, the carbon-based products mentioned in the description may be of fossil or biobased origin. In the latter case, they may partially or completely result from biomass or be obtained from renewable starting materials resulting from biomass.

Composite According to the Invention

Aromatic Polyphenol

In accordance with the invention, the aromatic polyphenol may be a single molecule comprising one or more aromatic rings, at least one of these aromatic rings, or even each aromatic ring, bearing at least two hydroxyl functions in the meta position relative to one another, the two positions ortho to at least one of the hydroxyl functions being unsubstituted. Such a single molecule does not comprise a repeat unit.

In accordance with the invention, the aromatic polyphenol may be, in another embodiment, a pre-condensed resin based:
- on at least one aromatic polyphenol comprising at least one aromatic ring bearing at least two hydroxyl functions in the meta position relative to one another, the two positions ortho to at least one of the hydroxyl functions being unsubstituted; and
- on at least one compound capable of reacting with said aromatic polyphenol comprising an aldehyde function, for example an aromatic aldehyde bearing at least one aldehyde function, comprising at least one aromatic ring but alternatively an aldehyde not in accordance with the invention, for example formaldehyde.

Such a pre-condensed resin based on aromatic polyphenol is in accordance with the invention and comprises, unlike the single molecule described above, a repeat unit. In this instance, the repeat unit comprises at least one aromatic ring bearing at least two hydroxyl functions in the meta position relative to one another.

In another embodiment, the aromatic polyphenol is a mixture of an aromatic polyphenol that forms a single molecule and of a pre-condensed resin based on aromatic polyphenol.

In the particular embodiments that follow, the aromatic ring or rings of the aromatic polyphenol are described. For the sake of clarity, the "aromatic polyphenol" is described therein in its single molecule form. This aromatic polyphenol will then be able to be condensed and will in part define the repeat unit. The characteristics of the pre-condensed resin are described in greater detail below.

In a preferred embodiment, the aromatic ring of the aromatic polyphenol bears three hydroxyl functions in the meta position relative to one another.

The two positions ortho to each hydroxyl function are preferably unsubstituted. This is intended to mean that the two carbon atoms located on either side of (in the position ortho to) the hydroxylated carbon atom (i.e. that which bears the hydroxyl function) just bear a hydrogen atom.

Even more preferentially, the remainder of the aromatic ring of the aromatic polyphenol is unsubstituted. This is intended to mean that the other carbon atoms of the remainder of the aromatic ring (those other than the carbon atoms bearing hydroxyl functions) just bear a hydrogen atom.

In one embodiment, the aromatic polyphenol comprises several aromatic rings, at least two of these each bearing at least two hydroxyl functions in the meta position relative to one another, the two positions ortho to at least one of the hydroxyl functions of at least one aromatic ring being unsubstituted.

In a preferred embodiment, at least one of the aromatic rings of the aromatic polyphenol bears three hydroxyl functions in the meta position relative to one another.

The two positions ortho to each hydroxyl function of at least one aromatic ring are preferably unsubstituted.

Even more preferentially, the two positions ortho to each hydroxyl function of each aromatic ring are unsubstituted.

Advantageously, each aromatic ring of the aromatic polyphenol is a benzene ring.

By way of example of an aromatic polyphenol comprising a single aromatic ring, mention may in particular be made of resorcinol and phloroglucinol, as a reminder having the structural formulae:

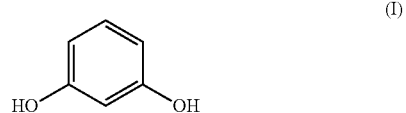

(I)

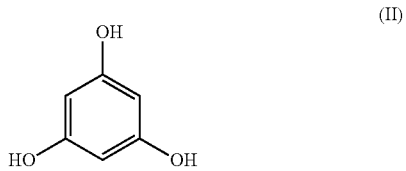

(II)

By way of examples, in the case in which the aromatic polyphenol comprises several aromatic rings, at least two of these aromatic rings, which are identical or different, are selected from those of general formulae:

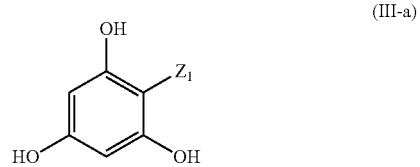

(III-a)

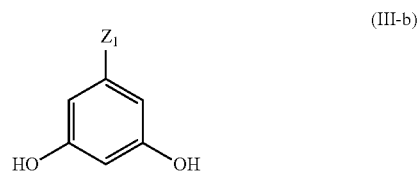

(III-b)

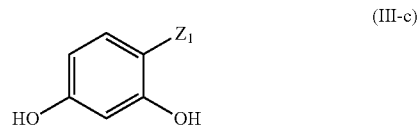

(III-c)

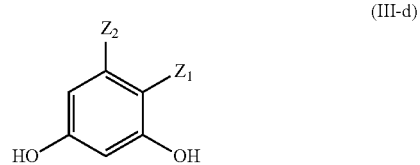

(III-d)

in which the $Z_1$ and $Z_2$ symbols, which are identical or different, if there are several of them on the same aromatic ring, represent an atom (for example, carbon, sulfur or oxygen) or a connecting group, by definition at least divalent, which connects at least these two aromatic rings to the remainder of the aromatic polyphenol.

Another example of aromatic polyphenol is 2,2',4,4'-tetrahydroxydiphenyl sulfide having the following structural formula:

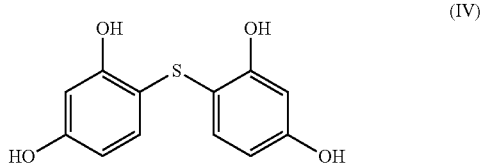 [SMILES: Oc1ccc(Sc2ccc(O)cc2O)c(O)c1]

(IV)

Another example of aromatic polyphenol is 2,2',4,4'-tetrahydroxydiphenyl benzophenone having the following structural formula:

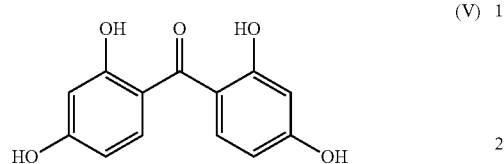

(V)

It is noted that each compound IV and V is an aromatic polyphenol comprising two aromatic rings (of formulae III-c), each of which bears at least two (in this instance two) hydroxyl functions in the meta position relative to one another.

It is noted, in the case of an aromatic polyphenol comprising at least one aromatic ring in accordance with formula III-b, that the two positions ortho to each hydroxyl function of at least one aromatic ring are unsubstituted. In the case of an aromatic polyphenol comprising several aromatic rings in accordance with formula III-b, the two positions ortho to each hydroxyl function of each aromatic ring are unsubstituted.

According to one embodiment of the invention, the aromatic polyphenol is selected from the group consisting of resorcinol (I), phloroglucinol (II), 2,2',4,4'-tetrahydroxydiphenyl sulfide (IV), 2,2',4,4'-tetrahydroxybenzophenone (V), resins pre-condensed from at least one of these aromatic polyphenols and the mixtures of these compounds. In a particularly advantageous embodiment, the aromatic polyphenol is phloroglucinol.

In one embodiment, the aromatic polyphenol comprises a pre-condensed resin based on the aromatic polyphenol as described in any one of these embodiments.

This pre-condensed resin is advantageously based:
on at least one aromatic polyphenol as defined above, and preferentially selected from the group consisting of resorcinol, phloroglucinol, 2,2',4,4'-tetrahydroxydiphenyl sulfide, 2,2',4,4'-tetrahydroxybenzophenone and the mixtures thereof; and
on at least one compound capable of reacting with said aromatic polyphenol comprising an aldehyde function, and preferentially an aromatic aldehyde bearing at least one aldehyde function, comprising at least one aromatic ring.

Advantageously, the compound capable of reacting with said aromatic polyphenol comprising an aldehyde function is selected from the group consisting of formaldehyde, furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds. Very advantageously, the compound comprising an aldehyde function is selected from the group consisting of furfuraldehyde, 2,5-furandicarboxaldehyde, 1,4-benzenedicarboxaldehyde, 1,3-benzenedicarboxaldehyde, 1,2-benzenedicarboxaldehyde and the mixtures of these compounds.

Thus, in the pre-condensed resin based on aromatic polyphenol, the repeat unit corresponds to the characteristics of the aromatic polyphenol defined above except that at least one of the carbon atoms of the aromatic ring, which was unsubstituted, is connected to another unit.

Irrespective of the compound other than the aromatic polyphenol at the heart of the pre-condensed resin, this pre-condensed resin is devoid of free formaldehyde. Specifically, even in the case where the pre-condensed resin is based on an aromatic polyphenol as described previously and on formaldehyde, since the formaldehyde has already reacted with the aromatic polyphenol, the pre-condensed resin is devoid of free formaldehyde liable to be able to react with the aromatic polyphenol in accordance with the invention in a subsequent step.

The aromatic polyphenol may also comprise a mixture of a free aromatic polyphenol molecule and of a pre-condensed resin based on aromatic polyphenol, as described above. In particular, the aromatic polyphenol may also comprise a mixture of phloroglucinol and of a pre-condensed resin based on phloroglucinol.

Aromatic Aldehyde

Preferably, the aromatic ring of the aromatic aldehyde bears the aldehyde function.

More preferentially, the aromatic aldehyde is an aromatic polyaldehyde in which the aromatic ring bears at least two aldehyde functions.

In one embodiment, the aromatic ring of the aromatic aldehyde is selected from the group consisting of a benzene ring and a furan ring, preferably the aromatic ring of the aromatic aldehyde is a benzene ring a benzene ring.

In another embodiment, the aromatic aldehyde is of general formula (A):

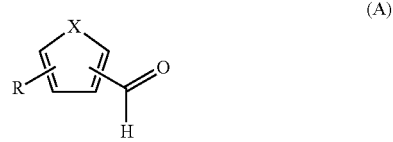

(A)

in which:
X comprises N, S or O,
R represents —H or —CHO.

The aldehyde is preferentially of general formula (A'):

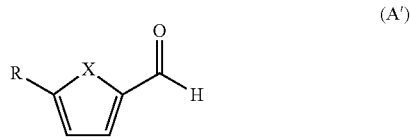

(A')

Even more preferentially, R represents —CHO.

According to a preferential embodiment, X represents O.

In a variant of the aldehyde of general formula (A), X represents O and R represents —H. The aldehyde used is then of formula (Ba):

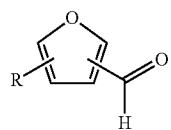

(Ba)

In a variant of the aldehyde of general formula (A'), X represents O and R represents —H. The aldehyde used is then furfuraldehyde and is of formula (B'a):

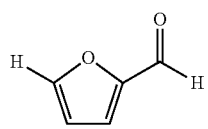

(B'a)

In another variant of the aldehyde of general formula (A), X represents O and R represents —CHO. The aldehyde used is then of formula (Bb):

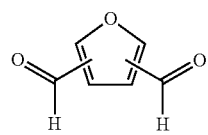

(Bb)

In another variant of the aldehyde of general formula (A'), X represents O and R represents —CHO. The aldehyde used is then 2,5-furandicarboxaldehyde and is of formula (B'b):

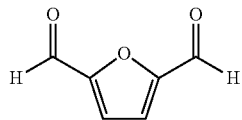

(B'b)

In another embodiment, X comprises N.

In a variant of the aldehyde of general formula (A), X represents NH. The aldehyde used is of formula (Ca):

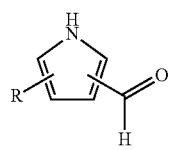

(Ca)

In a variant of the aldehyde of general formula (A'), X represents NH. The aldehyde used is of formula (C'a):

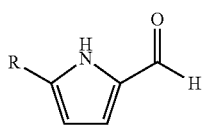

(C'a)

R preferably represents —CHO in the variant of the aldehyde of formula (C'a) and the aldehyde obtained is then 1H-pyrrole-2,5-dicarboxaldehyde.

In another variant of the aldehyde of general formula (A), X represents NR1 with R1 representing an alkyl, aryl, arylalkyl, alkylaryl or cycloalkyl group. The aldehyde used is of formula (Cb):

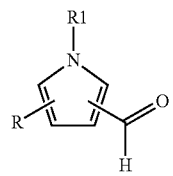

(Cb)

In another embodiment, X comprises S.

In a variant of the aldehyde of general formula (A), X represents S. The aldehyde used is of formula (Da):

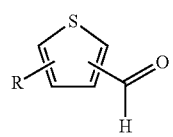

(Da)

In a variant of the aldehyde of general formula (A'), X represents S. The aldehyde used is of formula (D'a):

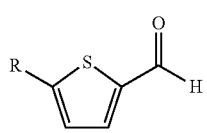

(D'a)

R preferably represents —CHO in the variant of the aldehyde of formula (IV'a) and is then 2,5-thiophenedicarboxaldehyde.

In another variant of the aldehyde of general formula (A), X represents SR2 with R2 representing an alkyl, aryl, arylalkyl, alkylaryl or cycloalkyl group. The aldehyde used is of formula (Db):

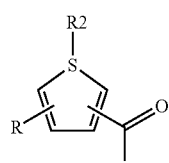

(Db)

In yet another variant of the aldehyde of general formula (A), X represents R3-S—R2 with R2 and R3 representing, each independently of one another, an alkyl, aryl, arylalkyl, alkylaryl or cycloalkyl group. The aldehyde used is of formula (Dc):

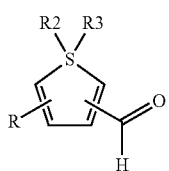

(Dc)

In yet another variant of the aldehyde of general formula (A), X represents S=O. The aldehyde used is of formula (Dd):

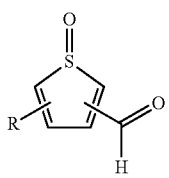

(Dd)

In yet another variant of the aldehyde of general formula (A), X represents O=S=O. The aldehyde used is of formula (De):

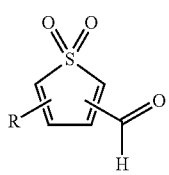

(De)

Among the various embodiments described above, preference will be given to the embodiments and variants in which X represents NH, S or O. In these embodiments and variants, it will be possible, in accordance with the invention, to have R representing —H or —CHO and preferably R representing —CHO. In these embodiments and variants, R will preferentially be in the 5 position and the —CHO group will preferentially be in the 2 position on the aromatic ring (general formula (A')).

The adhesive composition is preferably devoid of formaldehyde.

When the phenol-aldehyde resin is based on several aldehydes, at least one of which is an aromatic aldehyde in accordance with the invention, each aldehyde other than the aromatic aldehyde in accordance with the invention is preferentially different from formaldehyde. The adhesive composition is then also preferentially devoid of formaldehyde.

In other words and preferably, the or each aldehyde of the phenol-aldehyde resin is different from formaldehyde.

"Devoid of formaldehyde" is understood to mean that the content by weight of formaldehyde, by total weight of the aldehyde or aldehydes, is strictly less than 1%.

In some embodiments, the adhesive composition can comprise formaldehyde. Preferably, the adhesive composition then comprises a content by weight of formaldehyde, by total weight of the aldehyde or aldehydes, of less than or equal to 10%, preferably less than or equal to 5% and more preferentially less than or equal to 2%.

In yet another embodiment, the aromatic aldehyde is selected from the group consisting of 1,2-benzenedicarboxaldehyde, 1,3-benzenedicarboxaldehyde, 1,4-benzenedicarboxaldehyde, furfuraldehyde, 2,5-furandicarboxaldehyde and the mixtures of these compounds, preferably the aromatic aldehyde is selected from 1,3-benzenedicarboxaldehyde, 1,4-benzenedicarboxaldehyde, furfuraldehyde, 2,5-furandicarboxaldehyde and the mixtures of these compounds, more preferentially the aromatic aldehyde is 1,4-benzenedicarboxaldehyde.

Other Preferred Compounds of the Adhesive Composition

Preferably, the adhesive composition comprises at least one unsaturated elastomer latex. It should be remembered that a latex is a stable dispersion of microparticles of elastomer(s) in suspension in an aqueous solution. Unsaturated (that is to say, bearing carbon-carbon double bonds) elastomer latices, especially diene elastomer latices, are well known to those skilled in the art.

The elastomer(s) of the latex is or are dispersed in the resin and provide(s) a good bond between the adhesive layer and the elastomeric material in which the reinforcing element is embedded. Such a latex also has the advantage of being relatively soft and flexible which makes it possible to accompany the deformations of the reinforcing element without the adhesive layer breaking. Finally, the elastomer(s) of such a latex has or have the advantage of exhibiting green tack with the elastomeric material in which the reinforcing element is embedded. Thus, during the manufacture of the composite, the reinforcing element coated with the adhesive composition adheres to the elastomeric material which does not slide around the coated reinforcing element.

The unsaturated elastomer of the latex is preferentially a diene elastomer, more preferentially a diene elastomer selected from the group consisting of polybutadienes, butadiene copolymers, polyisoprenes, isoprene copolymers, vinylpyridine-styrene-butadiene terpolymers, ethylene/alpha-olefin type elastomers, polychloroprene elastomers and the mixtures of these elastomers. Advantageously, the ethylene/alpha-olefin type elastomer is selected from the group consisting of ethylene-propylene copolymers (EPM), ethylene-propylene-diene copolymers (EPDM), and the mixtures of these copolymers.

The aqueous adhesive composition in accordance with the invention may of course comprise all or some of the additives customary for aqueous adhesive compositions, such as those used in conventional RFL adhesives; mention will be made, for example, of bases such as aqueous ammonia, sodium, potassium or ammonium hydroxide, dyes, fillers such as carbon black or silica, antioxidants or other stabilizers, and thickeners, for example carboxymethyl cellulose, or gelling agents, for example a gelatin, making it possible to increase the viscosity of the composition. Mention will also be made of additives that make it possible to modify the setting or gelling time and the open time of the resin. As is known to those skilled in the art, the setting or gelling time is the length of time for which it is possible to apply the resin to its substrate and the open time is the length of time for which, after application of the resin to its substrate, it is possible to leave the resin in the open air without adversely affecting the quality of the subsequent adhesive bond with the complementary substrate. The setting time or gelling time and the open time are especially dependent on the temperature, pressure or else the resin concentration.

Process for Manufacturing the Adhesive Composition

N1 is defined as the number of reactive sites on the aromatic aldehyde, as follows: an aldehyde function represents two reactive sites. Thus, for example, 1,4-benzenedicarboxaldehyde has N1=4 reactive sites.

N2 is defined as the number of reactive sites of the aromatic polyphenol, as follows: each free carbon on the aromatic ring adjacent to a hydroxyl function borne by the aromatic ring represents a reactive site, each free carbon only being able to be counted as a reactive site for a single adjacent hydroxyl function. Thus, for example, resorcinol and phloroglucinol each have N2=3 reactive sites and 2,2',4,4'-tetrahydroxydiphenyl sulfide has N2=4 reactive sites.

Typically, during a first resinification step, the constituents of the thermosetting resin itself are mixed.

This first resinification step may be carried out according to several embodiments.

In a first embodiment, use is made of a pre-condensed resin based on aromatic polyphenol, that is to say that which results based:
- on at least one aromatic polyphenol comprising at least one aromatic ring bearing at least two hydroxyl functions in the meta position relative to one another, the two positions ortho to at least one of the hydroxyl functions being unsubstituted; and
- on at least one compound capable of reacting with said aromatic polyphenol comprising at least one aldehyde function.

The pre-condensed resin based on aromatic polyphenol is advantageously prepared by gradually mixing the aromatic polyphenol and the compound capable of reacting with said aromatic polyphenol comprising at least one aldehyde function, for example formaldehyde, in molar amounts as described above.

In a first variant, the components on which the pre-condensed resin is based are mixed in a basic solvent, such as an aqueous sodium hydroxide solution, preferably having a pH of between 8 and 13, more preferentially between 9 and 12.

In a second variant, the components on which the pre-condensed resin is based are mixed in an acidic or neutral solvent such as an aqueous solution having a pH of between 4 and 7, preferably between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the pre-condensed resin.

Regardless of the variant, the combined constituents are mixed with stirring for a time which may vary depending on the temperature used and the specific composition targeted, for example for a period of time which may vary between 1 min and 6 h, at a temperature of between 20° C. and 90° C., preferentially between 20° C. and 60° C.

As described above, it is advantageously possible to neutralize the medium so as to obtain a pre-condensed resin that can be stored and used subsequently.

In order to prepare the pre-condensed resin, the molar amount n2 of aromatic polyphenol A2 and the molar amount n1 of the aromatic compound A1 are such that $[(n2*N2)+(n'2N'2)]/(n1*N1)>1$, preferably $1<[(n2*N2)+(n'2N'2)]/(n1*N1)<5$.

Then, in this first embodiment, this pre-condensed resin based on aromatic polyphenol and on aromatic aldehyde is mixed gradually in a basic solvent such as an aqueous sodium hydroxide solution, preferably having a pH of between 8 and 13, more preferentially between 9 and 12, or else in an acidic or neutral solvent such as an aqueous solution having a pH of between 4 and 7, preferably between 5 and 7. Regardless of whether it is in acidic or basic medium, all the constituents are mixed with stirring for a length of time which may vary depending on the temperature used and the specific composition targeted, for example for a duration which may vary between 1 min and 6 h, at a temperature of between 20° C. and 90° C., preferentially between 20° C. and 60° C. Those skilled in the art will know how to adjust the molar amounts of the pre-condensed resin based on aromatic polyphenol and on aromatic aldehyde in order to obtain crosslinking and a concentration suitable for the desired use, especially as a function of the nature of the pre-condensed resin based on aromatic polyphenol.

In a second embodiment, use is made of a pre-condensed resin based:
- on at least one aromatic polyphenol comprising at least one aromatic ring bearing at least two hydroxyl functions in the meta position relative to one another, the two positions ortho to at least one of the hydroxyl functions being unsubstituted, and
- on at least one compound capable of reacting with said aromatic polyphenol comprising an aromatic aldehyde bearing at least one aldehyde function, comprising at least one aromatic ring.

In this second embodiment, the pre-condensed resin based on aromatic polyphenol is prepared under conditions analogous to the pre-condensed resin based on aromatic polyphenol of the first embodiment. Next, this pre-condensed resin based on aromatic polyphenol and on aromatic aldehyde is gradually mixed under conditions analogous to those of the first embodiment. Here too, those skilled in the art will know how to adjust the molar amounts of pre-condensed resin based on aromatic polyphenol and on aromatic aldehyde in order to obtain crosslinking and a concentration suitable for the desired use, especially as a function of the nature of the pre-condensed resin based on aromatic polyphenol.

In a third embodiment, use is made of an aromatic polyphenol according to the invention in the form of a single molecule, for example phloroglucinol.

In a first variant, the aromatic polyphenol is firstly mixed in a basic solvent such as an aqueous sodium hydroxide solution, preferably having a pH of between 9 and 13, more preferentially between 10 and 12, or else in an acidic or neutral solvent such as an aqueous solution having a pH of between 4 and 7, preferably between 5 and 7.

In some cases, for example at relatively high concentrations or in the case of an acidic solvent, those skilled in the art may find cause to add a thickener, for example carboxymethyl cellulose, or a gelling agent, for example a gelatin, in order to limit sedimentation of the aromatic polyphenol.

Next, the aromatic aldehyde is gradually added under conditions analogous to those of the first embodiment.

In a second variant, the aromatic aldehyde is firstly mixed in an aqueous solution, preferably in a basic solvent, such as an aqueous sodium hydroxide solution, preferably having a pH of between 8 and 13, more preferentially between 9 and 12. Then, the aromatic polyphenol is added and the components are mixed under conditions analogous to those of the first embodiment.

A molar amount n2 of aromatic polyphenol and a molar amount n1 of aromatic aldehyde are mixed such that $0.3 \leq (n2*N2)/(n1*N1) \leq 3$, and preferably $1<(n2*N2)/(n1*N1) \leq 2$.

In any one of these three embodiments, the partially crosslinked thermosetting resin is generally diluted in water before being added to the unsaturated elastomer latex or latices (if there are several), in order to form the aqueous adhesive composition of the invention, according to a general procedure which is well known to those skilled in the art in the field of RFL adhesives.

Preferably, during this step of forming the aqueous adhesive composition, it will be ensured that the aqueous adhesive composition has a pH of between 9 and 13, more preferentially between 10 and 12, so as to limit any potential precipitation of the, or of some, unsaturated elastomer latex (latices).

Thus, in the event that, during the resinification step preceding this step of forming the aqueous adhesive composition, use was made of an acidic or neutral solvent or a basic solvent which was neutralized, a base will be added that makes it possible to obtain a pH of between 9 and 13, more preferentially between 10 and 12, prior to the addition of the unsaturated elastomer latex (latices), so as to limit any potential precipitation of the, or of some, unsaturated elastomer latex (latices).

For example, the constituents of the adhesive composition are added in the following order: the water, possible water-soluble additives (for example aqueous ammonia), the latex or latices (any order) and the partially crosslinked thermosetting resin (diluted). The combination is mixed with stirring for 1 to 30 min, for example at 20° C.

During a final manufacturing step, referred to as maturation step, the aqueous adhesive composition is generally stored at ambient temperature (23° C.) for a maturation time which can typically vary from 1 to several hours, indeed even several days, before it is finally used.

In the final adhesive composition thus prepared, the solids content of phenol-aldehyde resin preferably represents between 5% and 60% by weight, more preferentially between 10% and 30% by weight, of the adhesive composition solids.

The content of unsaturated elastomer (that is to say, the solids of the latex or latices) is itself preferably between 40% and 95%, more preferentially between 70% and 90% by weight of the solids of the adhesive composition.

The weight ratio of polyphenol to aromatic aldehyde is preferentially between 0.1 and 3, more preferentially between 0.25 and 2.

The weight ratio of resin solids to latex solids is preferably between 0.1 and 2.0, more preferentially between 0.15 and 1.0.

The water content of the adhesive composition is preferably between 60% and 90%, more preferentially between 60% and 85%.

Advantageously, in particular in the case of a metallic reinforcing element, the adhesive composition comprises a gelatin. The gelatin makes it possible to slow down the dewetting of the reinforcing elements and thus to ensure better adhesion between the reinforcing element and the elastomeric material. "Gelatin" is understood to mean any mixture of proteins comprising products from the total or partial hydrolysis of collagen.

Elastomeric Matrix

The elastomeric matrix in which the reinforcing element(s) is or are embedded comprises one or more elastomers. The elastomeric matrix may also comprise one or more other components.

Preferably, the elastomeric matrix comprises at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Preferentially, the elastomeric matrix comprises at least one elastomer selected from the group consisting of an ethylene/alpha-olefin type elastomer, a hydrogenated nitrile elastomer (HNBR), a polychloroprene elastomer (CR), a polybutadiene (BR), a natural rubber (NR), a butadiene-styrene copolymer (SBR) and the mixtures of these elastomers. More preferentially, the elastomeric matrix comprises at least one elastomer selected from the group consisting of an ethylene/alpha-olefin type elastomer, a mixture of natural rubber (NR) and of an ethylene/alpha-olefin type elastomer, a polychloroprene elastomer (CR) and a mixture of a polybutadiene (BR) and of a hydrogenated nitrile elastomer (HNBR). More preferentially still, the elastomeric matrix comprises at least one elastomer selected from the group consisting of an ethylene/alpha-olefin type elastomer and a polychloroprene elastomer (CR).

In one preferred embodiment, the elastomeric matrix comprises an ethylene/alpha-olefin type elastomer. Preferably, in this embodiment, the elastomeric matrix comprises at least 50 phr of the ethylene/alpha-olefin type elastomer and more preferentially at least 60 phr of the ethylene/alpha-olefin type elastomer.

Advantageously, the ethylene/alpha-olefin type elastomer is selected from the group consisting of ethylene-propylene copolymers (EPM), ethylene-propylene-diene copolymers (EPDM), and the mixtures of these copolymers.

In one preferred embodiment, the elastomeric matrix comprises a polychloroprene elastomer. Preferably, in this embodiment, the elastomeric matrix comprises at least 50 phr of the polychloroprene elastomer and more preferentially at least 60 phr of the polychloroprene elastomer.

In one embodiment, the elastomeric matrix comprises a reinforcing filler.

When a reinforcing filler is used, use may be made of any type of reinforcing filler known for its abilities to reinforce an elastomeric matrix, for example an organic filler such as carbon black, a reinforcing inorganic filler such as silica, or else a blend of these two types of filler, especially a blend of carbon black and silica.

All the carbon blacks conventionally used in elastomeric matrices are suitable as carbon blacks.

"Reinforcing inorganic filler" should be understood, in the present application, by definition, as meaning any inorganic or mineral filler, regardless of its colour and its origin (natural or synthetic), also referred to as "white filler", "clear filler" or even "non-black filler", in contrast to carbon black, capable of reinforcing by itself alone, without means other than an intermediate coupling agent, an elastomeric matrix, in other words capable of replacing, in its reinforcing role, a conventional carbon black. Such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, a reinforcing inorganic filler is also understood to mean mixtures of various reinforcing inorganic fillers.

Mineral fillers of the siliceous type, especially silica ($SiO_2$), or of the aluminous type, especially alumina ($Al_2O_3$), are suitable in particular as reinforcing inorganic fillers.

Finally, those skilled in the art will understand that, as filler equivalent to the reinforcing inorganic filler described in the present section, use might be made of a reinforcing filler of another, especially organic, nature, provided that this reinforcing filler is covered with an inorganic layer, such as silica, or else comprises functional sites, especially hydroxyl sites, at its surface which require the use of a coupling agent in order to establish the bond between the filler and the elastomer.

Preferably, the content of total reinforcing filler (carbon black and/or reinforcing inorganic filler) is in a range from 10 to 100 phr.

The carbon black can advantageously constitute the sole reinforcing filler or the predominant reinforcing filler. Of course, it is possible to use just one carbon black or a blend of several carbon blacks of different grades. The carbon black can also be used as a blend with other reinforcing fillers and in particular reinforcing inorganic fillers as described above, and in particular silica.

Preferentially, the elastomeric matrix comprises an $\alpha$, $\beta$-unsaturated organic acid metal salt. Advantageously, the content of $\alpha$, $\beta$-unsaturated organic acid metal salt ranges from 2 to 50 phr, and preferably from 15 to 25 phr.

In one preferred embodiment, the $\alpha$, $\beta$-unsaturated organic acid metal salt is zinc methacrylate, in particular zinc monomethacrylate.

Preferably, the elastomeric matrix comprises various additives.

The rubber compositions may also comprise all or some of the standard additives customarily used in the elastomeric materials, such as for example plasticizers or extending oils, whether the latter are aromatic or non-aromatic in nature, protective agents, such as antiozone waxes, chemical antiozonants, antioxidants, antifatigue agents or else adhesion promoters, such as for example those disclosed in EP 0 964 030.

Preferably, the elastomeric matrix comprises a crosslinking system.

The crosslinking system advantageously comprises a peroxide, preferably an organic peroxide. Advantageously, the peroxide content ranges from 0.5 to 8 phr.

In certain embodiments, the crosslinking system comprises a co-crosslinking agent, preferably sulfur or triallyl cyanurate. Advantageously, the content of the co-crosslinking agent ranges from 0.5 to 5 phr.

Reinforcing Element

In one embodiment, the reinforcing element is metallic.

Advantageously, the reinforcing element is a threadlike reinforcing element. The term "threadlike reinforcing element" is understood to mean the elongate elements of great length relative to their cross section, whatever the shape, for example circular, oblong, rectangular or square, or even flat, of the latter, it being possible for this threadlike element to be straight or not straight, for example twisted or wavy. When it is circular in shape, the diameter of each threadlike reinforcing element is preferably less than 5 mm, more preferably within a range extending from 0.1 to 0.5 mm. Mention will also be made of the strips or bands which exhibit a great length with respect to their thickness.

The reinforcing element can comprise, in one embodiment, a single elementary metallic monofilament. In another embodiment, the reinforcing element comprises several elementary metallic monofilaments assembled together, for example by braiding or twisting. Mention will be made, among the reinforcing elements comprising several elementary metallic monofilaments, for example, of layered cords and multistrand ropes. Each threadlike elementary metallic monofilament is unitary, that is to say that the constituents of each elementary metallic monofilament are inseparable from one another.

Advantageously, the metallic reinforcing element comprises one or more elementary metallic monofilaments each comprising a steel core. The steel core is monolithic, that is to say that it is, for example, made as one piece or moulded.

In one embodiment, the adhesive layer directly coats the steel core of the or each elementary metallic monofilament. The adhesive layer coats at least a portion of the or each elementary metallic monofilament. Thus, the adhesive layer can partially or completely coat the or each elementary metallic monofilament. Thus, in the embodiment in which the reinforcing element comprises a single elementary metallic monofilament, the adhesive layer can coat some portions of this monofilament or else the whole of it. In the embodiment in which the reinforcing element comprises several elementary metallic monofilaments, the adhesive layer can coat several elementary metallic monofilaments without coating others of them, or else can coat solely certain portions of some or all of the elementary metallic monofilaments.

The steel may have a pearlitic, ferritic, austenitic, bainitic or martensitic microstructure or a microstructure resulting from a mixture of these microstructures.

Preferably, the steel comprises a carbon content ranging from 0.2% to 1% by weight and more preferably from 0.3% to 0.7% by weight.

In one embodiment, the steel used comprises less than 0.5%, preferably at most 0.05%, limit included, and more preferentially at most 0.02%, limit included, by weight of chromium.

In another embodiment using "stainless" steel, the steel comprises at least 0.5%, limit included, preferably at least 5%, limit included, and more preferentially at least 15%, limit included, by weight of chromium.

In another embodiment, the adhesive layer directly coats a layer of a metallic coating directly coating the steel core of the or each elementary metallic monofilament. The metal of the layer of the metallic coating is made from a metal other than steel.

Preferably, the metal of the layer of the metallic coating directly coating at least a portion of the steel core of the or each elementary metallic monofilament is selected from zinc, copper, tin and the alloys of these metals. Mention will be made, as examples of alloys of these metals, of brass and bronze.

In yet another embodiment, the adhesive layer directly coats a nonmetallic intermediate adhesive layer coating the steel core of the or each elementary metallic monofilament. In a variant of this embodiment, the nonmetallic intermediate adhesive layer directly coats the layer of the metallic coating directly coating the steel core of the or each threadlike reinforcing element. The nonmetallic intermediate layer, generally known as adhesion primer, makes it possible, in combination with the adhesive layer comprising the adhesive composition, to improve the adhesion of the reinforcing element to the elastomeric bonding composition. Such adhesion primers are those commonly used by a person skilled in the art for the presizing of certain textile fibres (in particular polyester, for example PET, aramid or aramid/nylon fibres). For example, use could be made of an epoxy-based primer, in particular a primer based on polyglycerol polyglycidyl ether. Use could also be made of a primer based on blocked isocyanate.

Layer "directly" coating an object is understood to mean that the layer is in contact with the object without any other object, in particular another layer, being interposed between the two.

In another embodiment, the reinforcing element is nonmetallic.

The reinforcing element may thus be a threadlike element such as a monofilament, a multifilament ply of several elementary monofilaments, an assembly of several multifilament plies, a film, or also a fabric produced from one or more of these elements, for example a woven fabric, a twill fabric or a knit fabric.

Advantageously, the nonmetallic reinforcing element is a threadlike element. The term "threadlike" is generally understood to mean any elongate element of great length relative to its cross section, regardless of the shape, for example circular, oblong, rectangular, square, or even flat, of this cross section, it being possible for this threadlike element to be straight or not straight, for example twisted or wavy. The largest dimension of its cross section is preferentially less than 5 mm, more preferentially less than 3 mm. This threadlike element may take any known shape, it may for example be an elementary monofilament of large diameter (for example and preferably equal to or greater than 50 µm), a multifilament ply (consisting of a plurality of elementary filaments of small diameter, typically less than 30 µm), a folded yarn or cord formed from several multifilament plies or monofilament plies twisted or braided together, or else an assembly, a group or row of monofilaments or threadlike elements such as, for example, a band or strip comprising several of these monofilaments, multifilament plies or monofilament plies grouped together, for example aligned along a main direction, whether straight or not. Such threadlike elements may also be films. The term "film" is generally understood to mean an elongate element of great length relative to its cross section, the cross section of which has an aspect ratio (width to thickness) of greater than 5, preferably of greater than 10, and the width of which is preferentially at least equal to 3 mm, more preferentially at least equal to 5 mm.

Preferably, the nonmetallic reinforcing element comprises at least one multifilament ply of elementary monofilaments. Preferentially, the nonmetallic reinforcing element comprises several multifilament plies of elementary monofilaments, these multifilament plies being wound in a helix around one another.

Preferably, the nonmetallic reinforcing element is made from a material selected from the group consisting of textile materials, mineral materials and the combinations of these materials.

In the present application, by definition, "textile" is understood to mean, as is well known to those skilled in the art, any material made of a natural or synthetic substance, which is capable of being transformed into a monofilament, fibre or film by any appropriate transformation process. Mention may be made, for example, without the examples below being limiting, of a polymer spinning process, such as, for example, melt spinning, solution spinning or gel spinning.

In a variant, the nonmetallic reinforcing element is made from a textile material, preferably selected from the group consisting of polyesters, polyamides, polyketones, polyvinyl alcohols, celluloses and combinations of these materials.

Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate).

Mention may be made, among polyamides, of aliphatic polyamides such as polyamides 4-6, 6, 6-6 (nylon), 11 or 12 and aromatic polyamides such as aramid.

Mention may be made, among celluloses, of natural or artificial cellulose, such as cotton, rayon, linen, hemp.

More preferentially, the nonmetallic reinforcing element is made from a textile material selected from the group consisting of polyesters, aliphatic polyamides and aromatic polyamides and combinations of these materials.

In another variant, the nonmetallic reinforcing element is made from a mineral material selected from the group consisting of glass fibres, carbon fibres and the combinations of these materials.

Bonding Layer

Preferably, the elastomeric bonding composition comprises at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Preferentially, the elastomeric bonding composition comprises at least one elastomer selected from the group consisting of an ethylene/alpha-olefin type elastomer, a polychloroprene elastomer (CR), a natural rubber (NR) and the mixtures of these elastomers. More preferentially, the elastomeric bonding composition comprises at least one elastomer selected from the group consisting of an ethylene/alpha-olefin type elastomer, a mixture of natural rubber (NR) and of an ethylene/alpha-olefin type elastomer and a polychloroprene elastomer (CR). More preferentially still, the elastomeric bonding composition comprises at least one elastomer selected from the group consisting of an ethylene/alpha-olefin type elastomer and a polychloroprene elastomer (CR).

Advantageously, the ethylene/alpha-olefin type elastomer is selected from the group consisting of ethylene-propylene copolymers (EPM), ethylene-propylene-diene copolymers (EPDM), and the mixtures of these copolymers.

In one preferred embodiment, the elastomer(s) of the elastomeric bonding composition is or are identical to the elastomer(s) of the elastomer matrix.

Preferably, the elastomeric bonding layer forms a sheath around the reinforcing element. Such a sheath makes it possible to ensure a mechanical clamping of the elastomeric bonding layer against the reinforcing element coated with the adhesive layer.

In one embodiment, the adhesive layer directly coats the nonmetallic reinforcing element.

In another embodiment, the adhesive layer directly coats a cohesion composition impregnating the nonmetallic reinforcing element. The reinforcing elements thus impregnated are then subjected to the coating by the adhesive composition. Preferably, the cohesion composition is based on a reaction product of an isocyanate. Such a reaction product is for example a uretidinedione, an isocyanurate or a mixture of these two compounds.

Layer "directly" coating an object is understood to mean that the layer is in contact with the object without any other object, in particular another layer, being interposed between the two.

In one particularly preferred embodiment, the composite forms a power transmission belt.

Advantageously, the power transmission belts comprises a mechanical drive layer arranged in contact with the elastomeric body, the mechanical drive layer being provided with ribs.

Preferably, the drive layer is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Advantageously, the elastomer of the elastomeric composition of the drive layer is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers.

More preferentially, the ethylene/alpha-olefin type elastomer is selected from the group consisting of ethylene-propylene copolymers (EPM), ethylene-propylene-diene copolymers (EPDM), and the mixtures of these copolymers.

Process for Manufacturing the Composite and a Power Transmission Belt

Another subject of the invention is a process for manufacturing a composite, comprising the following steps:

1) arranging, in the uncured state, a stack comprising, in this order:
   a first elastomeric layer made from a first elastomeric material,
   at least one reinforcing element coated with an adhesive layer made from an adhesive composition, the adhesive layer being directly coated with an elastomeric bonding layer made from an elastomeric bonding composition, the adhesive composition comprising at least one phenol-aldehyde resin based:
   on at least one aromatic polyphenol comprising at least one aromatic ring bearing at least two hydroxyl functions in the meta position relative to one another, the two positions ortho to at least one of the hydroxyl functions being unsubstituted, and
   on at least one aromatic aldehyde bearing at least one aldehyde function, comprising at least one aromatic ring,
   a second elastomeric layer made from a second elastomeric material,
2) moulding and crosslinking the stack.

In one preferred embodiment, the process comprises, prior to the step of arranging the stack, a step of impregnating the reinforcing element with a cohesion composition.

Advantageously, the process comprises, prior to the step of arranging the stack, a step of coating the reinforcing element with the adhesive composition, it being possible for this coating step to advantageously be carried out after the impregnating step described above.

Advantageously, the process comprises, prior to the step of arranging the stack, a step of coating the adhesive layer directly with the elastomeric bonding composition, this step implicitly being carried out after the step of coating the reinforcing element with the adhesive composition.

The step of coating the adhesive composition on the reinforcing element may be carried out according to any suitable method, especially by any known coating technique, such as, for example, spraying, impregnation by dipping, travelling through a bath or other equivalent technique for depositing a thin or ultra-thin film of adhesive, or else by a combination of one or more of these techniques.

The solids weight of the aqueous adhesive composition deposited on one kilogram of the reinforcing element is preferably between 5 and 100 g, more preferentially between 30 and 70 g, more preferentially still between 40 and 60 g.

In one of the embodiments, prior to the step of coating the reinforcing element with the adhesive composition, the reinforcing element is impregnated with a cohesion composition.

After the step described above of coating the adhesive composition, the coated reinforcing element is subjected to a first heat treatment, targeted at removing any solvent or water, at a temperature of preferably between 110° C. and 260° C., more preferentially between 130° C. and 250° C., for example by passing through a tunnel oven, typically with a length of several metres, such as those commonly used for heat treatment after sizing of textile reinforcing elements coated with an RFL adhesive.

The anhydrous material thus obtained is then subjected to a second heat treatment in order to terminate the crosslinking of the adhesive composition, preferentially carried out in air in a tunnel oven as described above. The treatment temperature is preferably between 150° C. and 350° C. The treatment times are from a few seconds to a few minutes, according to the circumstances (for example, between 10 s and 10 min).

Where appropriate, those skilled in the art will know how to adjust the temperature and the duration of the heat treatment above according to the particular operating conditions of the invention, especially according to the exact nature of the reinforcing element, in particular depending on whether the treatment is carried out on monofilaments, multifilament plies, assemblies of multifilament plies or films. In particular, those skilled in the art will have the advantage of scanning the treatment temperatures and times so as to search, by successive approximations, for the operating conditions leading to the best adhesion results, for each specific embodiment of the invention.

The step of direct coating of the adhesive layer with the elastomeric bonding composition may be carried out by any known coating technique, such as for example impregnation by dipping, impregnation by brushing, cementation or else by a combination of one or more of these techniques. Very preferentially, the adhesive layer is directly coated with the elastomeric bonding composition by extruding a sheath of the elastomeric bonding composition around the reinforcing element coated with the adhesive layer. Extruding the sheath around the adhesive layer makes it possible to ensure a good cohesion between the sheath and the adhesive composition, improving the endurance of the final composite.

Advantageously, each first and second elastomeric material comprises at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

More advantageously still, each first and second elastomeric material comprises at least one elastomer selected from the group consisting of an ethylene/alpha-olefin type elastomer, a hydrogenated nitrile elastomer (HNBR), a polychloroprene elastomer (CR), a polybutadiene (BR), a natural rubber (NR), a butadiene-styrene copolymer (SBR) and the mixtures of these elastomers. More preferentially, each first and second elastomeric material comprises at least one elastomer selected from the group consisting of an ethylene/alpha-olefin type elastomer, a mixture of natural rubber (NR) and of an ethylene/alpha-olefin type elastomer, a polychloroprene elastomer (CR) and a mixture of a polybutadiene (BR) and of a hydrogenated nitrile elastomer (HNBR). More preferentially still, each first and second elastomeric material comprises at least one elastomer selected from the group consisting of an ethylene/alpha-olefin type elastomer and a polychloroprene elastomer (CR).

Preferably, the ethylene/alpha-olefin type elastomer is selected from the group consisting of ethylene-propylene copolymers (EPM), ethylene-propylene-diene copolymers (EPDM), and the mixtures of these copolymers.

In one particular embodiment, during the step of arranging the stack, a third elastomeric layer made from a third elastomer material is stacked, after the second elastomeric layer.

Advantageously, the third elastomer material is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers.

Preferably, the elastomer of the elastomeric composition of the third elastomeric material is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers.

More preferentially, the ethylene/alpha-olefin type elastomer is selected from the group consisting of ethylene-propylene copolymers (EPM), ethylene-propylene-diene copolymers (EPDM), and the mixtures of these copolymers.

Another subject of the invention is a process for manufacturing a power transmission belt comprising the following steps:
1) arranging, in the uncured state, a stack comprising, in this order:
 a first elastomeric layer made from a first elastomeric material,
 at least one reinforcing element coated with an adhesive layer made from an adhesive composition, the adhesive layer being directly coated with an elastomeric bonding layer made from an elastomeric bonding composition, the adhesive composition comprising at least one phenol-aldehyde resin based:
  on at least one aromatic polyphenol comprising at least one aromatic ring bearing at least two hydroxyl functions in the meta position relative to one another, the two positions ortho to at least one of the hydroxyl functions being unsubstituted, and
  on at least one aromatic aldehyde bearing at least one aldehyde function, comprising at least one aromatic ring,
 a second elastomeric layer made from a second elastomeric material,
 a third elastomeric mechanical drive layer arranged in contact with the second elastomeric layer and made from a third elastomeric material,
2) moulding and crosslinking the stack.

The features described above apply both to the process for manufacturing the composite and to the process for manufacturing the transmission belt.

Preferably, the stack is moulded and crosslinked so as to make mechanical drive ribs in the third layer.

Exemplary Embodiments of the Invention and Comparative Tests

Represented in FIG. 1 is a composite according to the invention that forms a power transmission belt P. The power transmission belt P is intended for driving any member in rotation. The power transmission belt P comprises an elastomeric body 20 made from an elastomeric matrix and in which the coated reinforcing elements R are embedded. The power transmission belt P also comprises a mechanical drive layer 22 arranged in contact with the elastomeric body 20. The mechanical drive layer 22 is provided with several ribs 24 that each extend along a general direction Y substantially perpendicular to a longitudinal direction X of the belt P. Each rib 24 has a trapezoidal shape in cross section. The general directions of the ribs 24 are substantially parallel to one another. The ribs 24 extend over the entire length of the belt P. These ribs 24 are intended to be engaged in the recesses or grooves of complementary shape, for example borne by pulleys on which the belt is intended to be mounted.

The elastomer body 20 is formed on the one hand by a first elastomeric layer 26 made from a first elastomeric material and on the other hand by a second elastomeric layer 28 made from a second elastomeric material. The mechanical drive layer 22 is formed by a third layer made from a third elastomeric material.

Each first and second elastomeric material comprises a reinforcing filler, here carbon black (10 to 100 phr), an $\alpha$, $\beta$-unsaturated organic acid metal salt, here zinc monomethacrylate (2 to 50 phr), an agent for dispersing the reinforcing filler (1 to 10 phr), an antioxidant (0.5 to 8 phr), an organic peroxide (0.5 to 8 phr), a co-crosslinking agent (0.5 to 5 phr by weight) and a plasticizer (1 to 20 phr by weight).

Each first and second elastomeric material also comprises at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers. In this case, each first and second elastomeric material comprises at least one elastomer selected from the group consisting of an ethylene/alpha-olefin type elastomer, a hydrogenated nitrile elastomer (HNBR), a polychloroprene elastomer (CR), a polybutadiene (BR), a natural rubber (NR), a butadiene-styrene copolymer (SBR) and the mixtures of these elastomers. More preferentially, each first and second elastomeric material comprises at least one elastomer selected from the group consisting of an ethylene/alpha-olefin type elastomer, a mixture of natural rubber (NR) and of an ethylene/alpha-olefin type elastomer, a polychloroprene elastomer (CR) and a mixture of a polybutadiene (BR) and of a hydrogenated nitrile elastomer (HNBR). More preferentially still, each first and second elastomeric material comprises at least one elastomer selected from the group consisting of an ethylene/alpha-olefin type elastomer and a polychloroprene elastomer (CR). Here, each first and second elastomeric material comprises a mixture of natural rubber (NR) and of an ethylene-propylene-diene copolymer (EPDM), the proportion of natural rubber being less than 30 phr.

The third elastomeric material is made from an elastomeric composition comprising at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers. In this case, the elastomer of the elastomeric composition of the third elastomeric material is selected from the group consisting of an ethylene/alpha-olefin type elastomer, a polychloroprene elastomer (CR), a polybutadiene (BR), a natural rubber (NR), a butadiene-styrene copolymer (SBR) and the mixtures of these elastomers. Here, the elastomer of the elastomeric composition of the third elastomeric material is an ethylene/alpha-olefin type elastomer, for example an ethylene-propylene copolymer (EPM), an ethylene-propylene-diene copolymer (EPDM) or a mixture of these copolymers.

Represented in FIGS. 2A and 2B are two variants of coated reinforcing elements R in accordance with the invention. Represented in FIG. 2A is a reinforcing element R comprising a reinforcing element 10 impregnated with a cohesion composition 12 described below, directly coated with an adhesive layer 14 made from an adhesive composition C1 described below. The reinforcing element 10 comprises several multifilament plies of elementary monofilaments 18, here monofilaments made of polyamide, in this case nylon 4-6. Unlike the reinforcing element R from FIG. 1A, the reinforcing element from FIG. 1B is devoid of cohesion composition 12. The coated reinforcing elements R from FIGS. 2A and 2B comprise an elastomeric bonding layer 16 directly coating the adhesive layer 14. The elastomeric body 20 directly coats the elastomeric bonding layer 16.

The elastomeric bonding composition comprises at least one elastomer selected from the group consisting of an ethylene/alpha-olefin type elastomer, a hydrogenated nitrile elastomer (HNBR), a nitrile elastomer (NBR), a chlorosulfonated polyethylene with alkyl groups (ACSM), a polychloroprene elastomer (CR), a polybutadiene (BR), a natural rubber (NR), a synthetic polyisoprene (IR), a butadiene-styrene copolymer (SBR), an isoprene-butadiene copolymer (BIR), an isoprene-styrene copolymer (SIR), a butadiene-styrene-isoprene copolymer (SBIR) and the mixtures of these elastomers. In this case, the elastomer of the elastomeric bonding composition is selected from the group consisting of an ethylene/alpha-olefin type elastomer, a polychloroprene elastomer (CR), a natural rubber (NR) and the mixtures of these elastomers. More preferentially, the elastomeric bonding composition comprises at least one elastomer selected from the group consisting of an ethylene/alpha-olefin type elastomer, a mixture of natural rubber (NR) and of an ethylene/alpha-olefin type elastomer and a polychloroprene elastomer (CR). More preferentially still, the elastomeric bonding composition comprises at least one elastomer selected from the group consisting of an ethylene/alpha-olefin type elastomer and a polychloroprene elastomer (CR). Here, each first and second elastomeric material comprises a mixture of natural rubber (NR) and of an ethylene-propylene-diene copolymer (EPDM), the proportion of natural rubber being less than 30 phr.

A process will now be described for manufacturing the belt P from the variants from FIGS. 2A, 2B of the coated reinforcing elements R.

Firstly, for the coated reinforcing element R from FIG. 2A, the process comprises a step of impregnating each reinforcing element 10 with the cohesion composition 12. In order to do this, the reinforcing element 10 is run through a bath generally based on isocyanate in a solvent, for example based on toluene.

Next, the process comprises a step of coating the reinforcing element with the adhesive composition C1. In order to do this, the reinforcing elements are run through the adhesive composition C0 or C1, then the reinforcing elements thus coated are dried in a drying oven at 140° C. for 30 s. Next the adhesive composition is crosslinked by passing the coated reinforcing elements through a treatment oven at 240° C. for 30 s.

Then, during a subsequent step, the process comprises a step of coating the adhesive layer directly with an elastomeric bonding composition. In this case, the adhesive layer C1 is directly coated with the elastomeric bonding composition by extruding a sheath of the elastomeric bonding composition around the reinforcing element coated with the adhesive layer layer. Reinforcing elements coated with the adhesive layer made from the adhesive composition, the adhesive layer being directly coated with the elastomeric bonding layer made from the elastomeric bonding composition, are then obtained. The elastomeric bonding layer then forms a sheath around the reinforcing element.

Next, in the uncured state, i.e. in the non-crosslinked state, a stack is arranged comprising in this order:
  the first elastomeric layer 26 made from the first elastomeric material,
  several reinforcing elements R as described above,
  the second elastomeric layer 28 made from the second elastomeric material,
  the third elastomeric layer 22 in contact with the second elastomeric layer 28 and made from the third elastomeric material.

Then, after this arranging step, the stack in the uncured state is manipulated and placed in a mould. The stack obtained previously is moulded and crosslinked. The belt P from FIG. 1 is then obtained.

Endurance Test

Five power transmission belts P1 to P5 were manufactured in a manner similar to the process described above in order to evaluate the endurance performance provided by the adhesive composition according to the invention (belts P1 and P2 according to the invention) relative to an adhesive composition of RFL type (control belts P3, P4 and P5).

For this, two aqueous adhesive compositions were prepared, one in accordance with the invention (hereinafter denoted C1) and one not in accordance with the invention (control composition, hereinafter denoted C0). Their formulations (expressed as percentage by weight) are presented in the appended Table 1. The amounts listed in this table are those of the constituents in the dry state, with respect to a total of 100 parts by weight of aqueous adhesive composition (that is to say, the constituents plus the water).

The control composition C0 is a conventional RFL adhesive.

The composition C1 comprises at least one phenol-aldehyde resin based on at least:

on at least one aromatic polyphenol comprising at least one aromatic ring bearing at least two hydroxyl functions in the meta position relative to one another, the two positions ortho to at least one of the hydroxyl functions being unsubstituted, and on at least one aromatic aldehyde bearing at least one aldehyde function, comprising at least one aromatic ring.

Regarding the aromatic polyphenol, the aromatic ring of the aromatic polyphenol bears three hydroxyl functions in the meta position relative to one another. The two positions ortho to each hydroxyl function are unsubstituted. The remainder of the aromatic ring of the aromatic polyphenol is unsubstituted. Here, the polyphenol comprises a single aromatic ring and this aromatic ring is a benzene ring. The polyphenol is selected from the group consisting of resorcinol, phloroglucinol, 2,2',4,4'-tetrahydroxydiphenyl sulfide, 2,2',4,4'-tetrahydroxybenzophenone, resins pre-condensed from at least one of these aromatic polyphenols and the mixtures of these compounds. Here, this is phloroglucinol.

Regarding the aldehyde, the aromatic ring bears the aldehyde function. The aromatic aldehyde is selected from the group consisting of 1,2-benzenedicarboxaldehyde, 1,3-benzenedicarboxaldehyde, 1,4-benzenedicarboxaldehyde, furfuraldehyde, 2,5-furandicarboxaldehyde and the mixtures of these compounds, preferably the aromatic aldehyde is selected from 1,3-benzenedicarboxaldehyde, 1,4-benzenedicarboxaldehyde, furfuraldehyde, 2,5-furandicarboxaldehyde and the mixtures of these compounds. The aromatic aldehyde is an aromatic polyaldehyde in which the aromatic ring bears at least two aldehyde functions, here exactly two aldehyde functions. The aromatic ring of the aromatic aldehyde is a benzene ring. More preferentially here, the aromatic aldehyde is 1,4-benzenedicarboxaldehyde.

The adhesive composition also comprises an unsaturated elastomer latex comprising one or more elastomers. In this case, the unsaturated elastomers of the latex are diene elastomers, preferably selected from the group consisting of polybutadienes, butadiene copolymers, polyisoprenes, isoprene copolymers, vinylpyridine-styrene-butadiene terpolymers, ethylene/alpha-olefin type elastomers, polychloroprene elastomers and the mixtures of these elastomers. Here, this is an NR/SBRNP-SBR mixture.

TABLE 1

| Adhesive compositions | C0 | C1 |
|---|---|---|
| Aldehyde: | | |
| Formaldehyde (1) | 0.9 | — |
| 1,4-Benzenedicarboxaldehyde (2) | — | 0.9 |
| Polyphenol: | | |
| Resorcinol (3) | 1.7 | — |
| Phloroglucinol (4) | — | 1.7 |
| Sodium hydroxide (5) | 0.2 | 0.2 |
| Elastomer latex: | | |
| NR (6) | 6.4 | 6.4 |
| SBR (7) | 3.2 | 3.2 |
| VP-SBR (8) | 6.4 | 6.4 |
| Aqueous ammonia (9) | 0.5 | 0.5 |
| Total weight of solids of adhesive composition | 19.3 | 19.3 |
| Weight of water | 80.7 | 80.7 |

TABLE 1-continued

| Adhesive compositions | C0 | C1 |
|---|---|---|
| Adhesion tests | | |
| $F_{max}$ at 20° C. | 100 | 120 |
| $F_{max}$ at 120° C. | 100 | 116 |

(1) Formaldehyde (from Caldic; diluted to 36%);
(2) 1,4-Benzenedicarboxaldehyde (from ABCR; purity of 98%);
(3) Resorcinol (from Sumitomo; purity of 99.5%);
(4) Phloroglucinol (from Alfa Aesar; purity of 99%);
(5) Sodium hydroxide (from Aldrich; diluted to 30%);
(6) NR Latex ("Trang Latex" from Bee tex; diluted to 61% by weight);
(7) SBR Latex ("Encord-201" from Jubilant; diluted to 41% by weight);
(8) Vinylpyridine-styrene-butadiene latex ("VP 106S" from Eliokem; diluted to 41%);
(9) Aqueous ammonia (from Aldrich; diluted to 21%).

Using these two adhesive compositions, several coated reinforcing elements R01, R02, R11 and R12 were prepared, the features of which are collated in Table 2 below.

Each reinforcing element is a nonmetallic reinforcing element comprising three multifilament plies of elementary monofilaments having a count of 2350 tex assembled together with a twist of 125 turns·m$^{-1}$. Each reinforcing element is made from a textile material, here an aliphatic polyamide, in this case nylon 4-6.

As indicated in Table 2, the reinforcing elements R01 and R11 are impregnated with a cohesion composition which is subsequently itself directly coated with the layer of adhesive composition, respectively C0 and C1. In this case, the cohesion composition is based on a reaction product of at least one isocyanate, here this reaction product is an isocyanurate. As indicated in Table 2, the reinforcing elements R02 and R12 are devoid of the cohesion composition.

Each reinforcing element R01, R02, R11 and R12 is coated with an adhesive layer C0 or C1 made from an adhesive composition and either directly coating the reinforcing element directly for the reinforcing elements R02 and R12, or directly coating the cohesion composition impregnating the reinforcing element for the reinforcing elements R01 and R11.

TABLE 2

| | R01 | R02 | R11 | R12 |
|---|---|---|---|---|
| Cohesion composition | Yes | No | Yes | No |
| Adhesive composition | C0 | C0 | C1 | C1 |

Then, for some of them (reinforcing elements used in the belts P1 to P4), the adhesive layer C0 or C1 was directly coated with the elastomeric bonding composition by extruding a sheath of the elastomeric bonding composition around the reinforcing element coated with the adhesive layer in accordance with the process described above.

Each power transmission belt P1 to P5 is then obtained, the features of which are collated in Table 3 below. Next, an endurance test was carried out during which ten samples were tested for each belt P1 to P5. Each sample was subjected to displacement cycles at a temperature between 100° C. and 150° C., at a frequency between 5 and 20 Hz under a preload of between 20 and 100 N.

TABLE 3

| | P1 | P2 | P3 | P4 | P5 |
|---|---|---|---|---|---|
| Cohesion composition | No | Yes | No | Yes | Yes |
| Adhesive composition | C1 | C1 | C0 | C0 | C0 |

TABLE 3-continued

|  | P1 | P2 | P3 | P4 | P5 |
|---|---|---|---|---|---|
| Reinforcing element | R12 | R11 | R02 | R01 | R01 |
| Bonding layer | Yes | Yes | Yes | Yes | No |
| Mean no. of cycles at failure | No. = $3 \times 10^6$ | No. > $10^8$ | No. = $3 \times 10^6$ | No. = $5 \times 10^6$ | No. < $10^6$ |

These results demonstrate that the belts according to the invention P1 and P2 have an endurance that is comparable to or even greater than belts that use conventional adhesive compositions of RFL type. The endurance is in particular markedly improved when the reinforcing element of the belt is impregnated with a cohesion composition (belt P2) which demonstrates a synergistic effect between the cohesion composition, the adhesive composition and the bonding layer.

Moreover, these results demonstrate that the presence of a bonding layer makes it possible to significantly improve the endurance of the belts. A posteriori, the inventors behind the invention explain this by the green tack that the bonding layer confers and which ensures a good cohesion between the adhesive composition and the elastomeric matrix. In the absence of this bonding layer, as is the case in the belt five, the cohesion created during the arrangement of the stack between the adhesive composition and the elastomeric matrix is insufficient and results in a reduced endurance.

The invention is not limited to the embodiments described above.

It could also be envisaged to use a composite in which the reinforcing element is metallic. Thus, the metallic reinforcing element would comprise one or more elementary metallic monofilaments each comprising a steel core. In one embodiment, the adhesive layer directly coats the steel core of the or each elementary metallic monofilament. In another embodiment, the adhesive layer directly coats a layer of a metallic coating directly coating the steel core of the or each elementary metallic monofilament. The metal of the layer of the metallic coating directly coating the steel core of the or each elementary metallic monofilament is selected from zinc, copper, tin and the alloys of these metals. Advantageously, the adhesive layer directly coats a nonmetallic intermediate adhesive layer coating the steel core of the or each elementary metallic monofilament.

The invention claimed is:

1. A process for manufacturing a composite, the process comprising the following steps:
   (1) arranging, in the uncured state, a stack comprising, in this order:
      a first elastomeric layer made from a first elastomeric material,
      at least one reinforcing element coated with an adhesive layer made from an adhesive composition, the adhesive layer being directly coated with an elastomeric bonding layer made from an elastomeric bonding composition, the adhesive composition comprising at least one phenol-aldehyde resin based on:
         at least one aromatic polyphenol comprising at least one aromatic ring bearing at least two hydroxyl functions in the meta position relative to one another, the two positions ortho to at least one of the hydroxyl functions being unsubstituted, and
         at least one aromatic aldehyde bearing at least one aldehyde function, comprising at least one aromatic ring, and
      a second elastomeric layer made from a second elastomeric material; and
   (2) molding and crosslinking the stack.

2. A process for manufacturing a power transmission belt, the process comprising the following steps:
   (1) arranging, in the uncured state, a stack comprising, in this order:
      a first elastomeric layer made from a first elastomeric material,
      at least one reinforcing element coated with an adhesive layer made from an adhesive composition, the adhesive layer being directly coated with an elastomeric bonding layer made from an elastomeric bonding composition, the adhesive composition comprising at least one phenol-aldehyde resin based on:
         at least one aromatic polyphenol comprising at least one aromatic ring bearing at least two hydroxyl functions in the meta position relative to one another, the two positions ortho to at least one of the hydroxyl functions being unsubstituted, and
         at least one aromatic aldehyde bearing at least one aldehyde function, comprising at least one aromatic ring,
      a second elastomeric layer made from a second elastomeric material, and
      a third elastomeric mechanical drive layer arranged in contact with the second elastomeric layer and made from a third elastomeric material; and
   (2) molding and crosslinking the stack.

* * * * *